United States Patent [19]
Evenson

[11] 3,956,835
[45] May 18, 1976

[54] LOG SKIDDER WITH IMPLEMENT MOUNTED CABLE GUIDE MEANS

[75] Inventor: Robert E. Evenson, Aurora, Ill.

[73] Assignee: Caterpillar Tractor Co., Peoria, Ill.

[22] Filed: Mar. 28, 1975

[21] Appl. No.: 563,269

[52] U.S. Cl. ............................. 37/117.5; 172/438; 172/801; 214/92
[51] Int. Cl.² ............................................ E02F 3/76
[58] Field of Search ........... 172/247, 251, 438, 801, 172/802, 803, 804, 805, 806, 807, 808, 809; 37/117.5, 118 R, 118 A, DIG. 3; 214/92, 523, DIG. 4; D40/5

[56] References Cited
UNITED STATES PATENTS

| | | | |
|---|---|---|---|
| 2,081,939 | 6/1937 | Tourneau | 172/808 |
| 2,713,218 | 7/1955 | Dyer | 37/117.5 |
| 2,764,824 | 10/1956 | Kepner | 172/251 |
| 2,770,895 | 11/1956 | Rymkevitch | 37/117.5 |
| 2,827,715 | 3/1958 | Wagner | 37/117.5 |
| 3,074,190 | 1/1963 | Wahl | 37/117.5 X |
| 3,265,428 | 8/1966 | Gilbert et al | 37/117.5 X |
| 3,424,326 | 1/1969 | Thatcher | 214/505 |
| 3,780,813 | 12/1973 | Davis et al | 172/438 |

Primary Examiner—Richard C. Pinkham
Assistant Examiner—Richard T. Stouffer
Attorney, Agent, or Firm—Phillips, Moore, Weissenberger Lempio & Strabala

[57] ABSTRACT

A log skidder comprises a bulldozer assembly mounted on either the forward or rearward end thereof and a cable guide mechanism, including a fairlead and roller, mounted on a blade of the bulldozer assembly for receiving and guiding a cable therethrough. A winch assembly for paying-out or paying-in the cable is mounted on the log skidder, adjacent to the blade. In one embodiment, the push arms of the bulldozer assembly are universally mounted on the log skidder for selective movement towards the forward or rearward end thereof.

11 Claims, 2 Drawing Figures

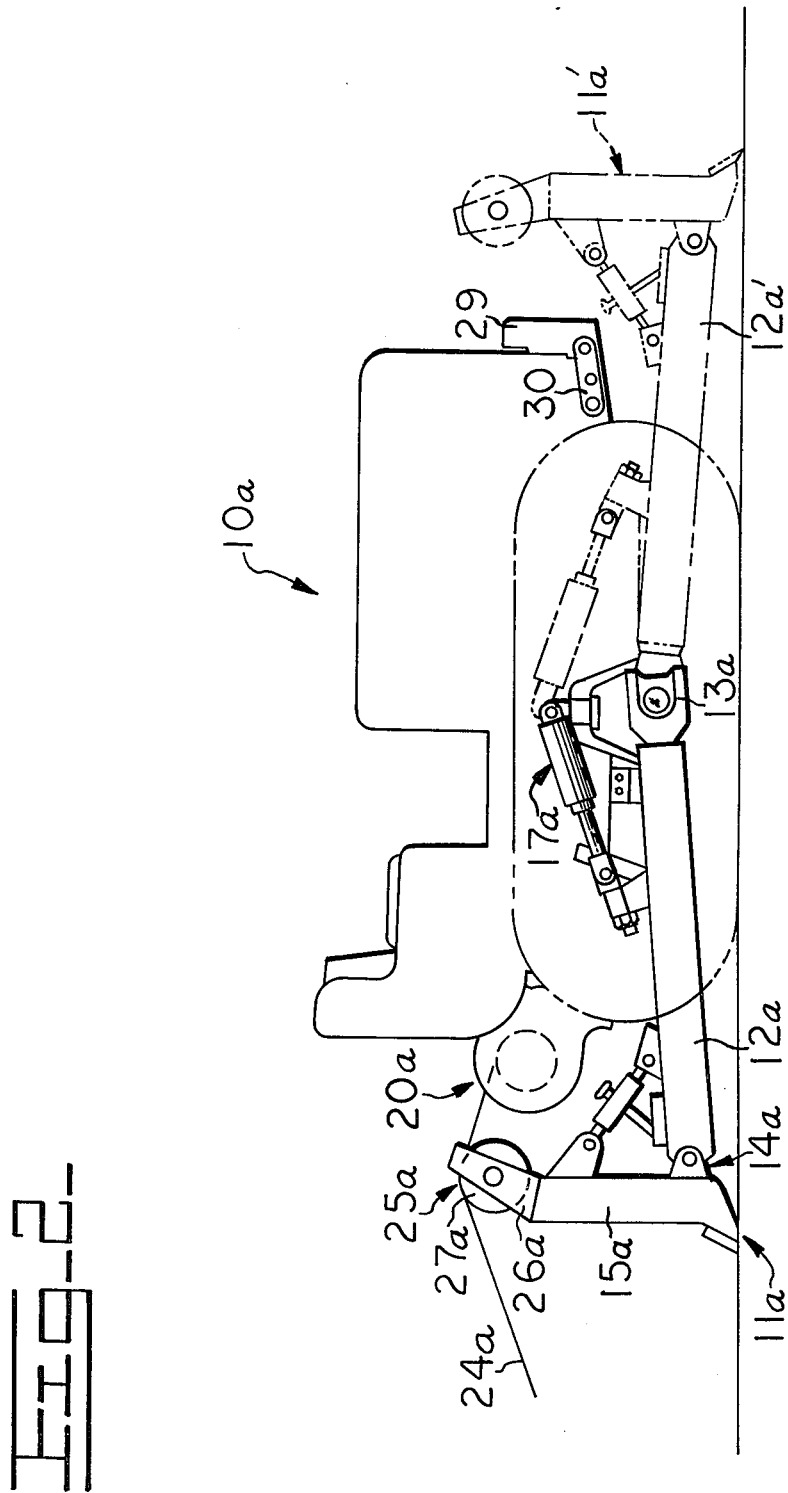

LOG SKIDDER WITH IMPLEMENT MOUNTED CABLE GUIDE MEANS

BACKGROUND OF THE INVENTION

Conventional log skidders comprise a winch assembly mounted on the rearward ends thereof to pay-out cable through a fairlead and roller assembly for log skidding purposes. Such assembly is normally mounted on a frame of the log skidder, adjacent to the winch assembly. A bulldozer assembly is oftentimes mounted on a forward end of the log skidder to increase the work capabilities thereof.

SUMMARY OF THIS INVENTION

An object of this invention is to provide an improved log skidder adapted to provide a high degree of skidding productivity primarily due to increased pulling capabilities. The log skidder comprises a winch means mounted thereon to selectively pay-out a cable therefrom, a bulldozer assembly mounted on an end of the vehicle and cable guide means mounted on a blade of the bulldozer assembly for receiving and guiding the cable therethrough for log skidding purposes. In the preferred embodiment of this invention, the winch and bulldozer assemblies are both mounted on a forward end of the log skidder and the operator's station is mounted transversely thereon to facilitate ready observation of work being performed at either end of the log skidder.

BRIEF DESCRIPTION OF THE DRAWINGS

Other objects of this invention will become apparent from the following description and accompanying drawings wherein:

FIG. 2 is a side elevational view of a second such embodiment wherein a winch assembly is mounted on a rearward end of the log skidder and a bulldozer assembly is adapted to be positioned at either a forward or rearward end thereof.

DETAILED DESCRIPTION

Figure 1:
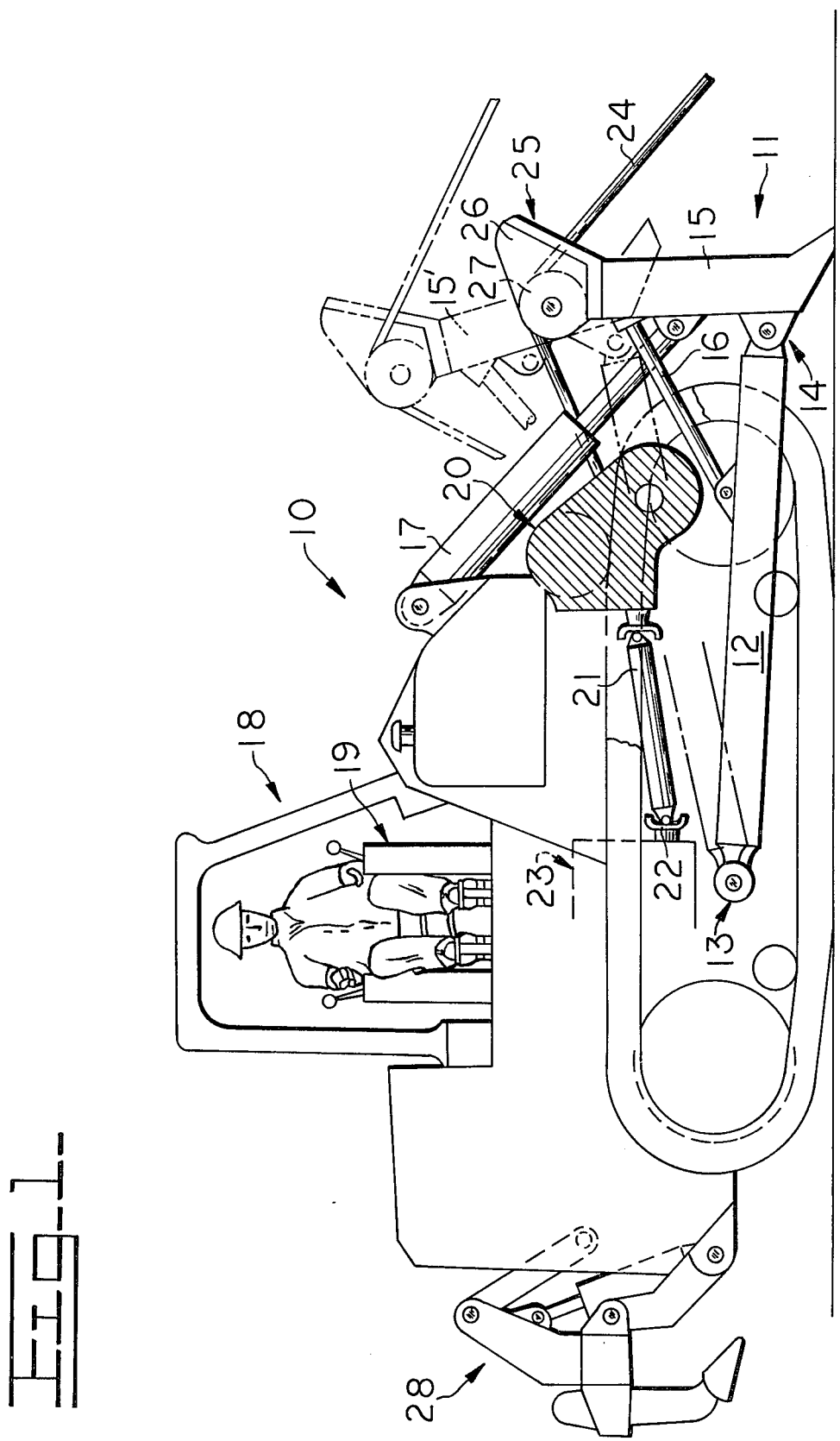
FIG. 1 is a side elevational view of a first log skidder embodiment of this invention having winch and bulldozer assemblies mounted on a forward end thereof.

FIG. 1 discloses a mobile track-type vehicle or log skidder 10 having a bulldozer assembly 11 mounted on a forward end thereof. The bulldozer assembly comprises a pair of push arms 12 (one shown) mounted on either side of the vehicle and each pivotally mounted at 13 on a frame thereof. A forward end of the push arm is pivotally mounted at 14 to a normally upstanding blade 15.

A tilt brace 16 is pivotally interconnected between each push arm and blade 15 whereas a double-acting hydraulic lift cylinder 17 is pivotally interconnected between the frame of the vehicle and the blade. The lift cylinder functions to selectively move the blade between its full-line lowered position and its phantom-line raised position 15'. An operator's station 18, including a seat 19, is disposed on the vehicle and transversely relative to a longitudinal axis thereof to permit the operator to readily observe operations occurring at both the forward and rearward ends of the vehicle.

A conventional winch assembly 20 is suitably mounted on a forward end of the vehicle and is adapted to be driven by power take-off means comprising a drive shaft 21 universally interconnected between the winch assembly and a power take-off 22 of a transmission, schematically shown at 23. The engine (not shown) for supplying power to power take-off 22 is suitably mounted on a rearward end of the vehicle. The winch assembly may be of the type disclosed in U.S. Pat. No. 3,729,171, assigned to the assignee of this application, which functions to selectively pay-out or pay-in a cable 24 under the control of the operator.

A cable guide means 25 is mounted on the upper end of blade 15 for receiving and guiding the cable therethrough. The cable guide means may comprise a standard box-like fairlead 26 having a roller 27 rotatably mounted therein to entrain the cable thereover. It should be noted that when blade 15 is maintained in its lowered position in engagement with the ground that it aids in stabilizing the vehicle during a log skidding operation.

Furthermore, the blade may be raised to its 15' position by cylinder 17 during a log skidding or hauling operation. It should be further noted that another work tool, such as the illustrated ripper assembly 28, can be suitably mounted on a rearward end of the vehicle to increase the overall work capabilities thereof. In such multi-tooled log skidders the transverse disposition of operator's station 18 on the vehicle facilitates a substantially unobstructed view of operations performed at both the forward and rearward ends thereof.

FIG. 2 discloses a second embodiment of this invention wherein corresponding constructions are depicted by identical numerals, but with numerals appearing in FIG. 2 being accompanied by an "*a*". In particular, a track-type vehicle 10*a* has a bulldozer assembly 11*a* mounted on a rearward end thereof. The bulldozer assembly comprises a pair of push arms 12*a* (one shown) each having its rearward end pivotally mounted on a frame of the vehicle at a universal joint connection 13*a* and its forward end pivotally connected at 14*a* to a blade 15*a*.

In this embodiment of the invention, a double-acting cylinder 17*a* is pivotally interconnected between each push arm 12*a* and the vehicle to selectively raise or lower the push arm. Such arrangement, fully disclosed in U.S. Pat. No. 2,764,824 assigned to the assignee of this application, facilitates swinging of the bulldozer assembly to its phantom-line position 11*a'* at a forward end of the vehicle.

A conventional winch assembly 20*a*, such as the type disclosed in U.S. Pat. No. 3,729,171, is mounted on a rearward end of the vehicle to selectively pay-out or pay-in a cable 24*a* for log skidding purposes. The cable is received and guided by a cable guide means 25*a*, including a fairlead 26*a* and a pulley 27*a*. If so desired, a counterweight 29 may be attached on the front end of the vehicle by a pair of brackets 30 (one shown) to counteract pulling forces on cable 24*a* during a log skidding operation. It should be noted that the FIG. 2 vehicle embodiment in effect converts a conventional bulldozer for additional use as a log skidder.

I claim:

1. A mobile vehicle comprising
    winch means including a cable associated therewith, said winch means mounted on an end of said vehicle for selectively paying-out said cable therefrom,
    a bulldozer assembly, including a blade disposed adjacent to said winch means at said end of said vehicle, mounted on said vehicle, and cable guide means including a pulley rotatably mounted directly over and closely adjacent to an upper edge of said blade, said cable guide means receiving and guiding said cable thereover.

2. The vehicle of claim 1 wherein said cable guide means further comprises a fairlead having said pulley rotatably mounted thereon, said cable entrained over said pulley.

3. The vehicle of claim 1 wherein said bulldozer assembly further comprises a pair of push arms mounted on either side of said vehicle and pivotally interconnected between a frame of said vehicle and said blade and means pivotally interconnected between said bulldozer assembly and said frame for selectively raising or lowering said blade.

4. The vehicle of claim 3 wherein each of said push arms is universally mounted on the frame of said vehicle for permitting said arm to be moved either towards a forward or a rearward end thereof.

5. The vehicle of claim 4 wherein said each of said bulldozer assembly and said winch means is mounted on a rearward end of said vehicle.

6. The vehicle of claim 5 wherein said cable guide means further comprises a fairlead mounted on an upper edge of said blade and wherein said pulley is rotatably mounted on said fairlead and having said cable entrained thereover.

7. The vehicle of claim 1 wherein said winch means is mounted on a forward end of said vehicle.

8. The vehicle of claim 7 further comprising engine driven power take-off means operatively connected to said winch means for selectively driving the same.

9. The vehicle of claim 7 further comprising an operator's station mounted thereon, including an operator's seat disposed transversely relative to a longitudinal axis of said vehicle whereby an operator can observe either end thereof.

10. The vehicle of claim 7 further comprising a work tool mounted on a rearward end of said vehicle.

11. The vehicle of claim 10 wherein said work tool comprises a ripper assembly.

* * * * *